US006594466B1

(12) United States Patent
Harned et al.

(10) Patent No.: US 6,594,466 B1
(45) Date of Patent: Jul. 15, 2003

(54) METHOD AND SYSTEM FOR COMPUTER BASED TRAINING

(75) Inventors: Stephen F. Harned, Exton, PA (US); William K. Weber, Jr., Elverson, PA (US); Robert Powell, Norwood, MA (US)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 09/576,961

(22) Filed: May 24, 2000

(51) Int. Cl.[7] .................................................. G09B 3/00
(52) U.S. Cl. .................... 434/350; 434/322; 434/307 R
(58) Field of Search ................................ 434/350, 219, 434/323, 322, 118, 119, 307 R

(56) References Cited

U.S. PATENT DOCUMENTS

| | | | |
|---|---|---|---|
| 5,255,386 A | | 10/1993 | Prager ............................ 707/5 |
| 5,727,950 A | * | 3/1998 | Cook et al. .................. 434/350 |
| 5,864,844 A | | 1/1999 | James et al. .................... 707/4 |
| 6,039,575 A | | 3/2000 | L'Allier et al. ............. 434/323 |
| 6,149,441 A | * | 11/2000 | Pellegrino et al. .......... 434/118 |
| 6,301,462 B1 | * | 10/2001 | Freeman et al. ............. 434/350 |

* cited by examiner

*Primary Examiner*—Joe H. Cheng
*Assistant Examiner*—John Sotomayor
(74) *Attorney, Agent, or Firm*—Hale and Dorr LLP; Cynthia K. Nicholson

(57) ABSTRACT

A method and system are provided for computer based training relating to a target system. A user interface includes at least one graphic display portion, and a courseware viewer portion. Several exercise modules are provided, each having (1) at least one display file, (2) at least one script corresponding to the display file(s), and (3) a work file, to be loaded into the target system. The steps in the exercise module are displayed by parsing a script in the exercise modules. The steps are sequentially displayed in the courseware viewer portion, and the corresponding display files are displayed in the display window(s). The work file is simultaneously loaded into the target system, and the target system is run by the user while displaying the exercise. The target system generates events corresponding to user responses to the exercise, and the training system displays appropriate confirmation and feedback messages based on the responses.

26 Claims, 13 Drawing Sheets

METHOD AND SYSTEM FOR COMPUTER BASED TRAINING

FIELD OF THE INVENTION

The present invention relates to computer based training systems. More specifically it concerns a training system operating within the environment of the software it teaches; where the training system utilizes software events to analyze user actions, compare actions to expected results, and provide to the user appropriate feedback.

DESCRIPTION OF THE RELATED ART

Computer training has conventionally been offered via a traditional (course guide) delivery method. In this situation, a traditional instructor describes a situation, describes primary tools or methods for handling the situation, demonstrates the software solution to the problem, and/or walks the user through the exercise presently the courseware materials. Unfortunately, in a traditional instructor led delivery, the instructor must continually make decisions based on the varying experience levels of students whether to address problems that individuals may be having versus the pace that has been set by the majority of the class. This causes frustration amongst both quick learners and slow learners. Moreover, the traditional instructor led delivery method requires an instructor, and presumes a class of some size.

Also conventionally provided is computer based training software. Such software typically uses either a passive information display within the subject program being taught, or alternatively uses a simulated environment that represents the program that is being taught. Neither of these canned approaches affords the user an opportunity to make mistakes and benefit from interactive feedback.

One of the few advantages of instructor-led courseware is that students can watch an experienced instructor complete a difficult example. Having observed the completion of the difficult example, the students can then attempt the same themselves.

One of the problems with instructor-led courseware, particularly where there are a large number of students and only one instructor, is that there is no feedback to the student. In these workbook style tutorials, there is nothing to reinforce the positive action of the student, and no corrective feedback for their mistakes. Conventionally available systems include principally instructor-led courseware, few of which consist of multimedia or browser-based tutorials. AUTODESK™ WEB-BASED LEARNING is a web browser based tutorial that is web delivered. Generally, this provides an online course guide and supporting data set to allow a student to swap screens with the AUTODESK AUTOCAD to perform the lesson, or print out the course materials and refer to them as the student walks through the exercise. AUTODESK also offers AUTOCAD LEARNING ASSISTANTS. AUTOCAD LEARNING ASSISTANTS is intended to be a comprehensive multimedia learning tool for novice users. Unfortunately, these and other multimedia-type learning systems cannot yet interact with the systems to be learned in an integrated manner.

Other available products include interactive training from Visio Corporation, which evidently does not utilize the actual software product which is being learned. Microsoft Corporation similarly offers instructor-led training, on-line training and self-paced training. The self-paced training appears to be largely centered around preparation for taking a certification exam. Other corporations offer non-interactive demonstrations and traditional instructor-led training offered via broadcast, such as Eagle Point Software and Intergraph Corporation.

Thus, there still remains a need for computer based training which has direct connections to the productive environment of the subject software. There also remains a need for a training system that can compare the results of user actions with a set of expected results, by receiving software events generated by the user actions. There further remains a need for a training system in which the user progresses automatically from one correctly completed step of the training exercise to the next when the user's results compare favorably with expected values within a specified tolerance. Further, there still remains a need for a computer-based training system that provides positive reinforcement for correct answers and corrective instruction for incorrect answers.

BRIEF SUMMARY OF THE INVENTION

It is an object of the present invention to solve the above-described problems, as further described below.

In accordance with one aspect of the invention, there is provided a method and system for computer based training relating to a target system. A user interface is provided, the user interface including at least one graphic display portion, and a courseware viewer portion. At least one exercise module is provided, the exercise module having (1) at least one display file, (2) at least one script corresponding to the at least one display file, and (3) a work file, to be loaded into the target system. The script is displayed in the courseware viewer portion, and the corresponding display file is displayed in the at least one display window.

According to another aspect of the method and system, the script includes several exercise steps. Displaying the script includes displaying each of the exercise steps. According to yet another aspect of the method and system, a user response to the exercise is received from the target system, and compared to an expected response. If the received user response is the expected response, a confirmation message is displayed, and if the received user response is not the expected response, a feedback message. According to a further aspect of the method and system, the user response to the exercise is received as an event from the target system.

In another aspect of the method and system several exercise modules are presented, from which one of the exercise modules is selected. In accordance with a further aspect of the method and system, the work file is loaded into the target system, and the target system is executed.

These and other objects, features and advantages of the present invention are readily apparent from the following drawings and detailed description.

DETAILED DESCRIPTION OF THE PREFERRED EMBODIMENT

Figure 1:
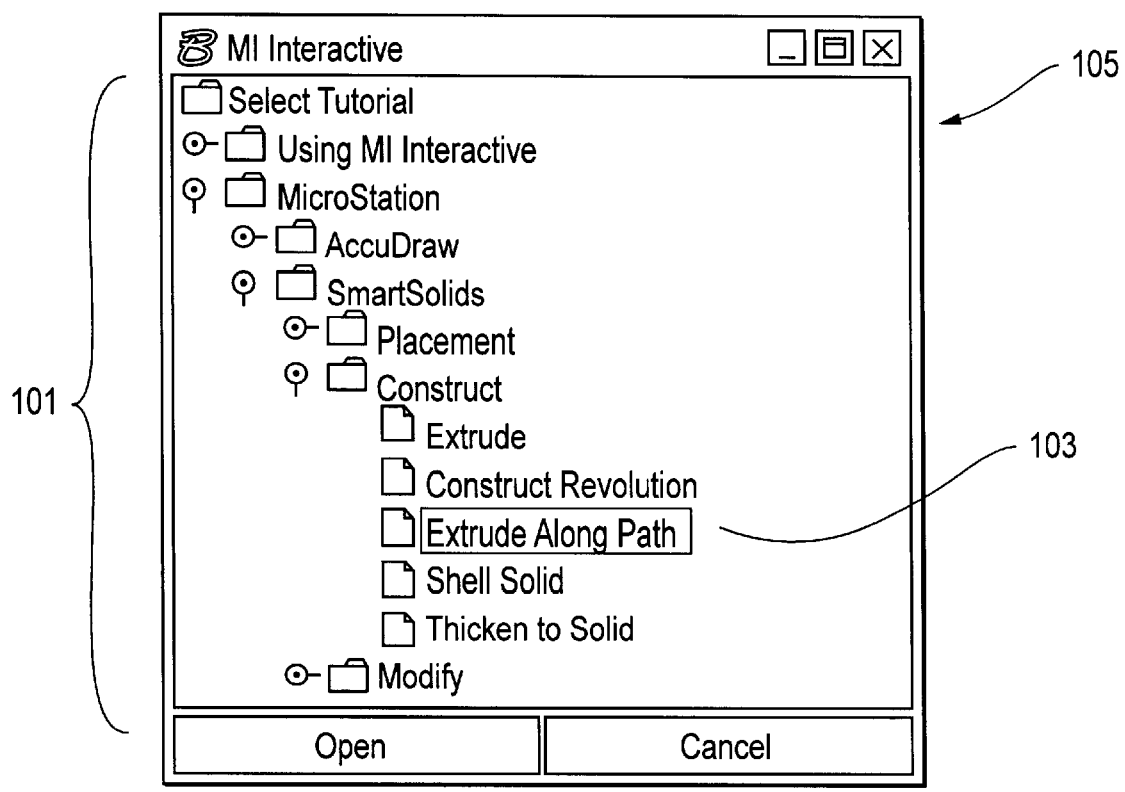
FIG. 1 is a user interface example illustrating the initiation of the interactive training system.

The preferred embodiment of the invention provides a graphical user interface in which a user can view both text descriptions and illustrative graphic images and multimedia animations of the subject tutorial exercise.

When a user of this graphical user interface creates a drawing element, a software event is generated which is then detected by the training system. Software events are also generated when a drawing element is selected, modified or deleted. Upon occurrence of an event that is appropriate to the currently displayed step in the exercise, the training system identifies the subject drawing element(s) and makes a comparison to expected results. The user is then notified of correct, or incorrect, completion of the step in the exercise.

The exercise modules that are viewable with the training system are preferably authored in an XML-based language, according to a Document Type Definition meeting the XML version 1.0 standard. Although XML offers a convenient format, other formats for the exercise modules are appropriate, including, for example, those which provide for text or documents or macros. The exercise module (such as an XML file for each exercise) then is essentially a script that includes the text description of each step, specifies the graphic illustration and multimedia content corresponding to each step, and specifies the expected results for each step in which the user's results will be tested. Appropriate feedback messages are also written into the exercise module (such as in an XML script) for both correct and incorrect completion.

As described in detail below, graphic images depicting intermediate steps are provided with each step in order to assist the user in learning the subject tool, or capability of the target system. Animated images depicting the described process are optionally provided, and can be activated by the user at appropriate points in the exercise.

Preferably, the training system is programmed utilizing the Java language, running in a virtual machine provided in the target software. A virtual machine inside the target software can take advantage of standard libraries or package classes (such as graphics drawing files or .DGN package classes) to allow ready access to elements which are to be operated on, e.g., design file elements, and environment settings. The virtual machine can include event generating code that generates software events corresponding to a completed step of each exercise, as well as code which responds to events which occur and initiates the interactive training. The event generating code can readily be incorporated into existing target system software. In the preferred embodiment, the elements to be operated on are graphic elements, and the target system is a graphics system.

Preferably, the graphic user interface of the training system appears in a user interface which is separate from the user interface of the target system, such as a window, but which remains visible to the user concurrently with the target system. The term "target system" is used herein to signify the system and/or software which is being taught by the interactive training software package.

Reference is made to FIG. 1, illustrating the initiation of the interactive training system. A menu is displayed responsive to a user command. Here, the menu is an index 101, appearing in the user interface 105, showing several exercises including the selected exercise 103 discussed in the following examples.

Figure 2:
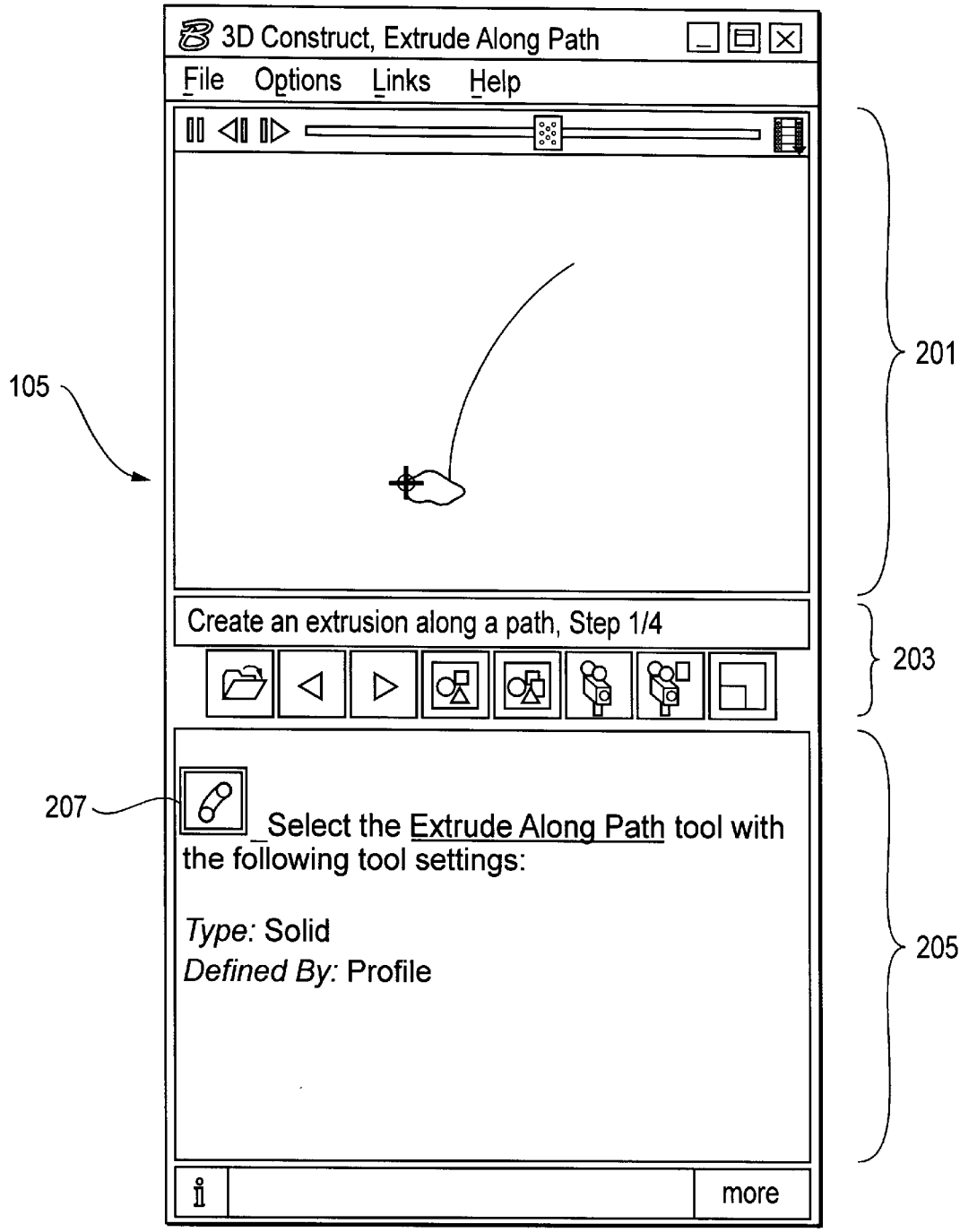
FIG. 2 is a user interface example illustrating user participation in an exercise.

Reference is made to FIG. 2. The user interface 105 displays graphic images, primarily in a graphic display portion 201 of the user interface 105. It further provides a user control portion 203 for control of the exercise. Appropriate controls, as illustrated, may include opening a tutorial exercise, backward and forward progression one step at a time through the tutorial script, and controls for playing an animated version of the tutorial exercise. An additional control is provided for viewing a supplemental graphic if it is specified in a text portion 205 of the window.

Figure 3:
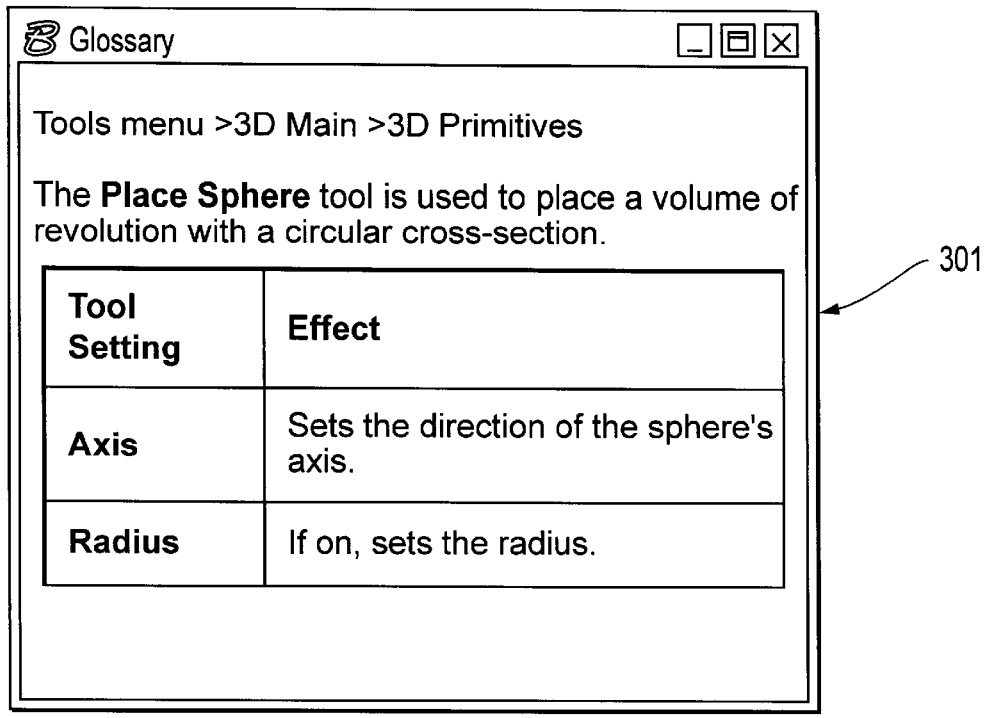
FIG. 3 is a user interface example showing a glossary.

Reference is made to FIG. 3. Other features of the user interface include links within the text descriptions of each exercise step. These are primarily used to provide additional information or explanations referred to generally as a "glossary". The links may be implemented as hypertext links to other data, files or sites. In the preferred embodiment, the glossary is one or more HTML files containing a "glossary" of terms and tools. The relevant portions of the glossary are preferably displayed in a glossary window 301 separate from the user interface window of training system. FIG. 3 shows the glossary window 301 displaying information about a specific tool in the target system.

Reference is made back to FIG. 2. When the user is instructed to select or activate a particular tool within the target system, an icon 207 is advantageously provided which is a link to the subject software. This can be clicked to activate the required tool. This provides the user with a shortcut as well as the means to activate which they might struggle to find otherwise.

Figure 4:
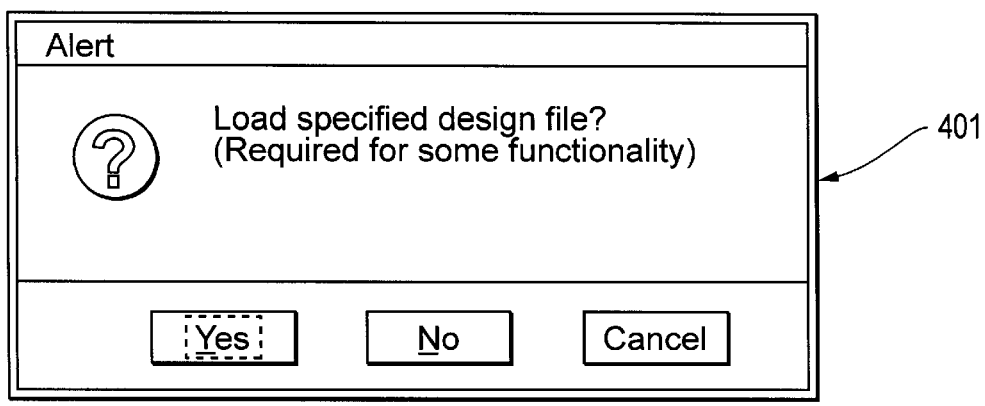
FIG. 4 is a user interface example showing the loading of a design file.
Figure 5:
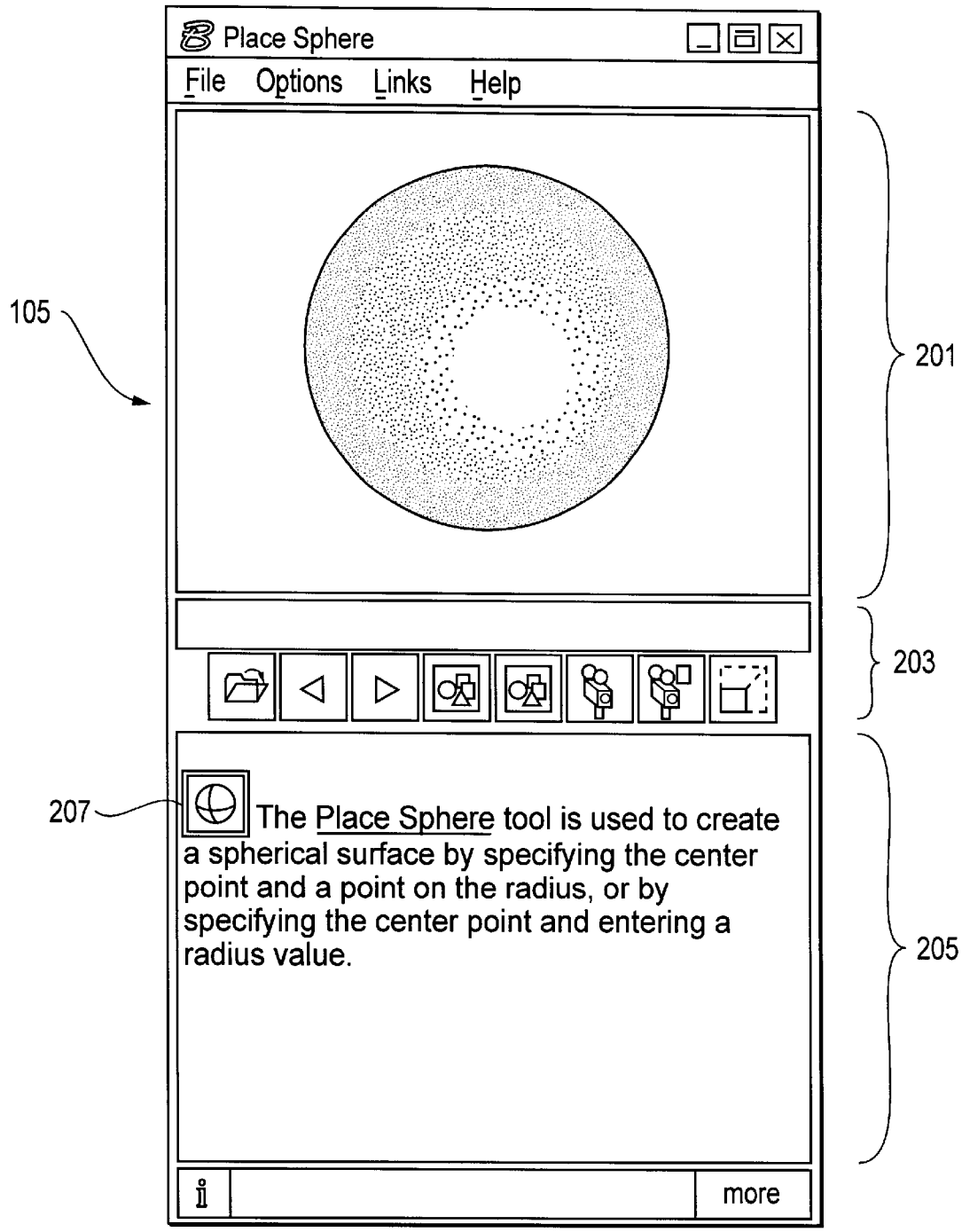
FIG. 5 is a user interface example illustrating user participation in another exercise.

When the user begins a tutorial exercise, a work file specifically corresponding to the subject exercise is loaded into the working environment of the target system. This provides the user with a starting point that is appropriate for completing the exercise. The work file, a prepared file in the default format of the target system, is advantageously specified in the tutorial script of each exercise. This can be readily done if the script is XML based. As shown in FIG. 4, the user is given the opportunity to approve or cancel the process of loading the work file via an alert 401. The appropriate work file, when opened in the context of the tutorial script, is copied to a temporary location, preserving the original file for subsequent uses and users, of the tutorial exercise. Each time the file is copied to the location specified by the target system as a repository for temporary files, possibly overwriting a previous version of the design file, but allowing each tutorial session to begin with a pristine work file.

Some conventional implementations of an electronic courseware system utilize an HTML browser to view HTML files that discuss the subject tool or technique. The significant advantages of the training system over this approach are twofold: the interaction between the user and the subject software is not inherent in an HTML delivered file; and the user must keep two applications visible concurrently, or view the tutorial document only briefly while switching to the subject software to try out the described tool and technique.

Similarly, a multimedia approach to computer based training does not provide the level of interactive feedback, nor does it afford the user the opportunity to try out the tools in a productive environment where mistakes can be made, and results compared with expected values.

The training system is a flexible framework for delivering interactive training materials to the end user's desktop. When the training system is initiated, as illustrated in FIG. 1 the user views a list of available exercise modules from which she/he can choose a module appropriate to the tool or task required. Each exercise module is intended to require at most 20 minutes to complete.

Demonstrations corresponding to some of the exercises may be provided, preferably as multi-media files. The demonstrations, typically animations, are delivered with the corresponding exercise files. It is convenient to provide the multi-media files in a format which is playable in a Java based video player that utilizes the Java Media Framework available from Sun Microsystems. This video format is also operating system independent, utilizing the Quicktime standard format from Apple, Inc. Other multi media formats may be used if desired. The graphical user interface provides the usual controls to play, pause, rewind and replay the video demonstration of the exercise as deemed necessary by the user.

Advantageously, the instructional text that is displayed also includes links to on-line help and to other exercises that describe similar tools and topics within the subject software. Optionally, at the end of the training module, a list of similar topics would be displayed to the user, so that the user can select a another exercise to continue the training session. Summary questions could also be displayed as HTML files with answers which would provide immediate feedback to the student.

Figure 14:
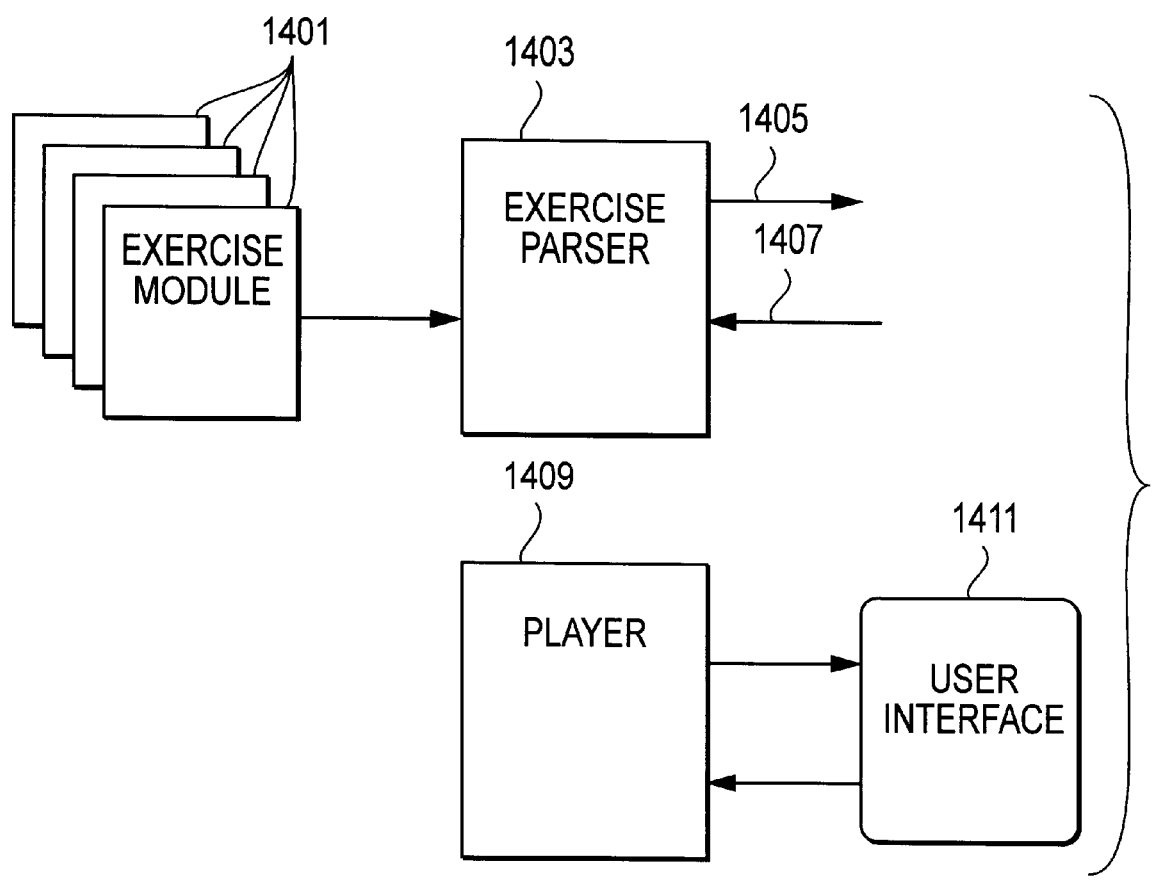
FIG. 14 is a block diagram illustrating the components of the training system.

Overall, the training system includes two components in addition to the content, as illustrated in FIG. 14. The first component is a program for parsing each exercise script of each exercise module 1401, such as an XML parser. The parser 1403 reads the selected XML based courseware content script file and takes appropriate output actions 1405 such as to display text and graphics, play a multimedia file, pose a question to the student, or begins the "watching" function of waiting for events 1407 reflecting the student's actions. An appropriate XML parser is commercially available from IBM. One advantage of a "watching" function implemented using software events, as described above, is that the training system thereby operates in real time.

The second component is the "player" application 1409 that includes the graphical user interface described previously. The player application controls the user interface 1411 and permits the user to view the text, graphic, and multimedia content of each exercise module. In the preferred embodiment, the player application is implemented using Java Foundation Classes (JFC), (also known as "Swing" classes), and is driven by the exercise parser 1403 in XML.

Figure 6:
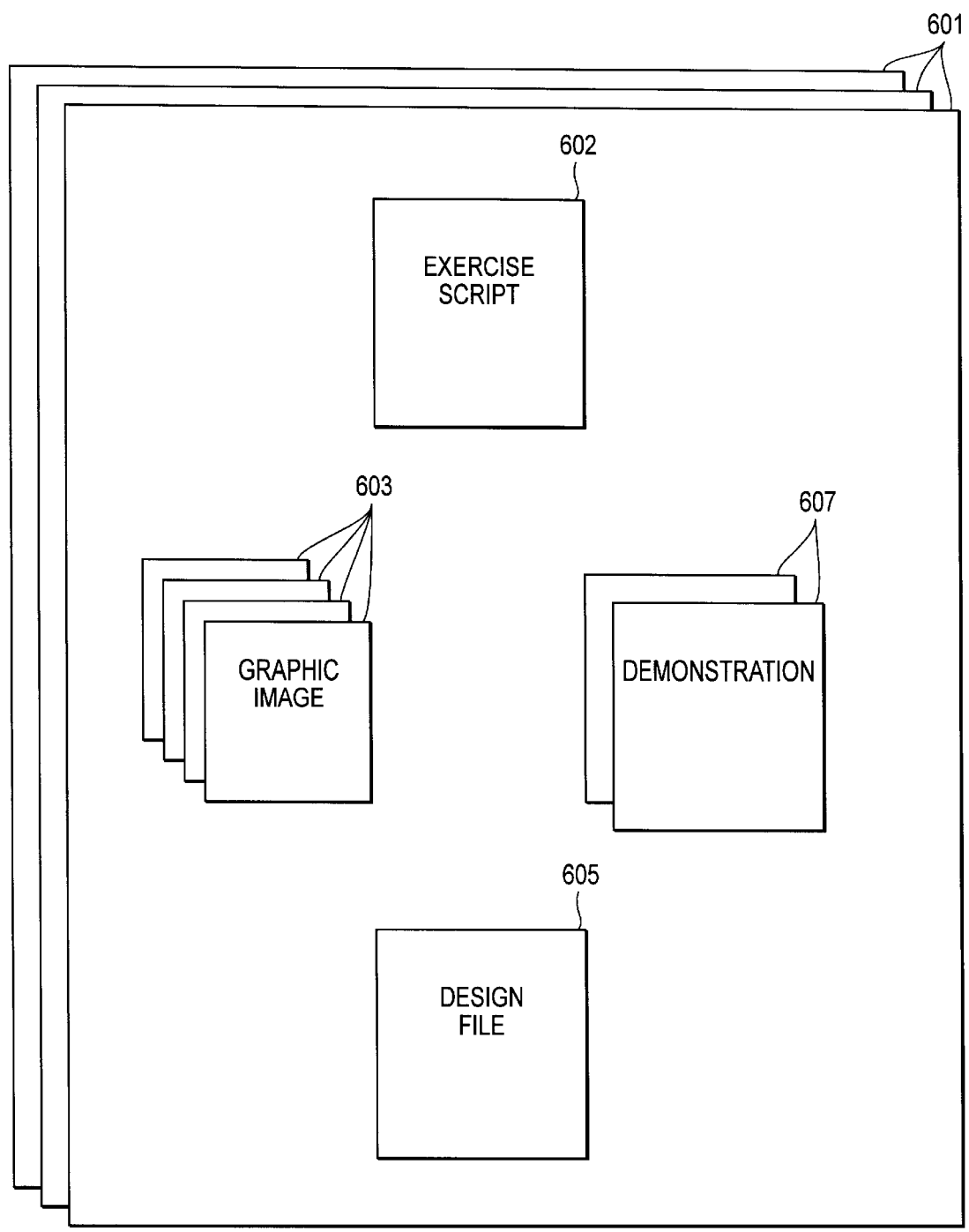
FIG. 6 is a block diagram illustrating the exercise modules.

The remaining component is the courseware content, contained in the exercise modules 601, as shown in FIG. 6. The courseware content for each exercise module includes an exercise script 602. The script can include text and may reference a display file or graphic images 603 (in conventional graphics formats) corresponding to steps in the exercise. Preferably, the content is authored using an XML editor to match the Document Type Definition specific to the target system. It can include text descriptions which may also include hypertext links, commands to the subject software to activate tools, and markup tags. In the preferred embodiment, the courseware content is a script for each exercise module consistent with the HTML 4.0 specification. The script 602 should specify the work file or design file 605 which the user will have the option to load, and it specifies the exercise steps and the graphic and multimedia demonstration files 603, 607. The script 602 also includes the expected values for each of the exercise steps which create, select, modify or delete drawing elements so that the user's actions can be compared for the basis of interactive feedback.

Figure 7:
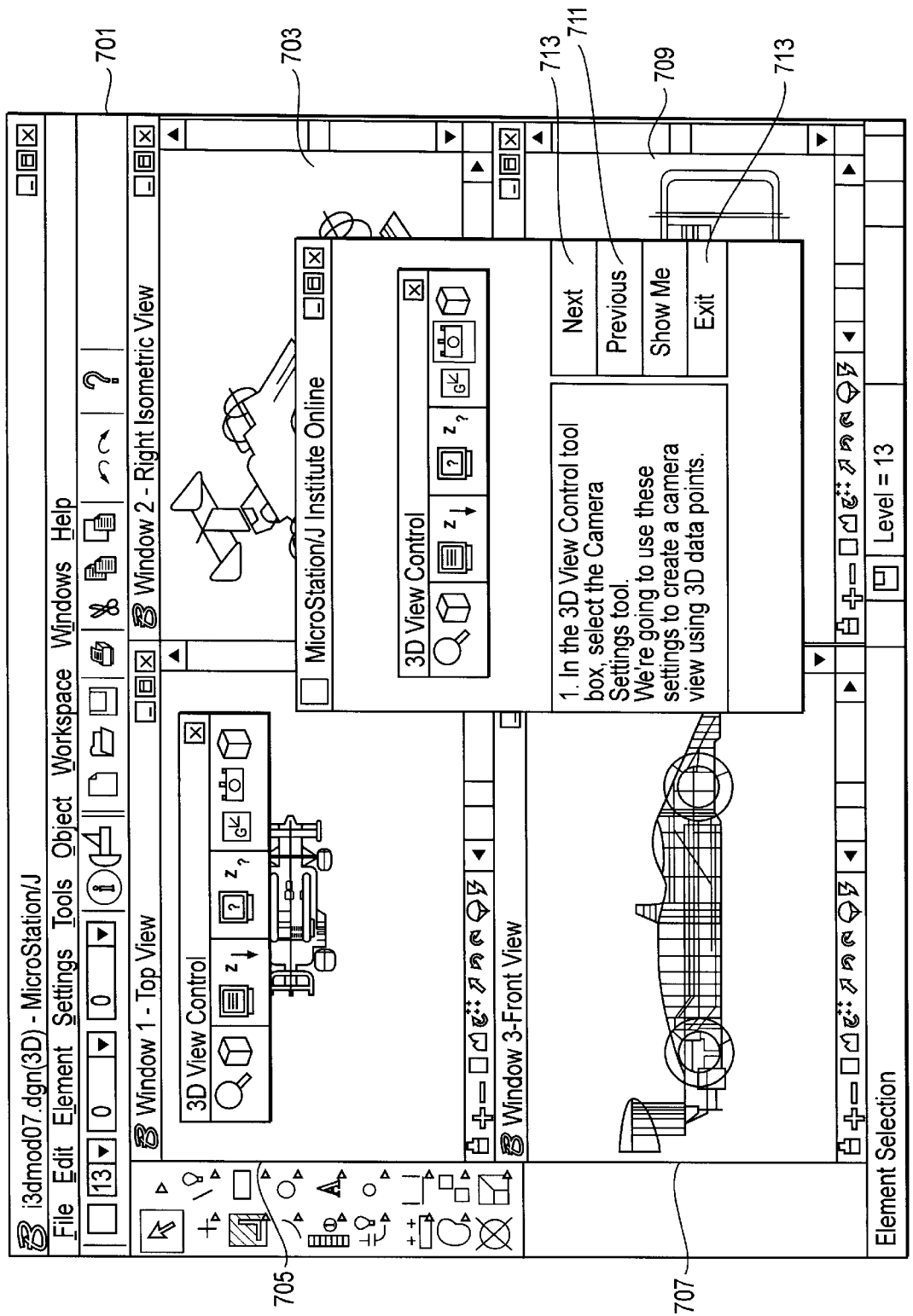
FIG. 7 is an alternative example of a user interface illustrating student participation in exercises.

FIGS. 7 through 13 illustrate an alternative example of the training system. Reference is made to FIG. 7. In this example, the text portion 711 and the graphics portion 703, 705, 707, 709 are displayed each in a separate window.

Figure 8:
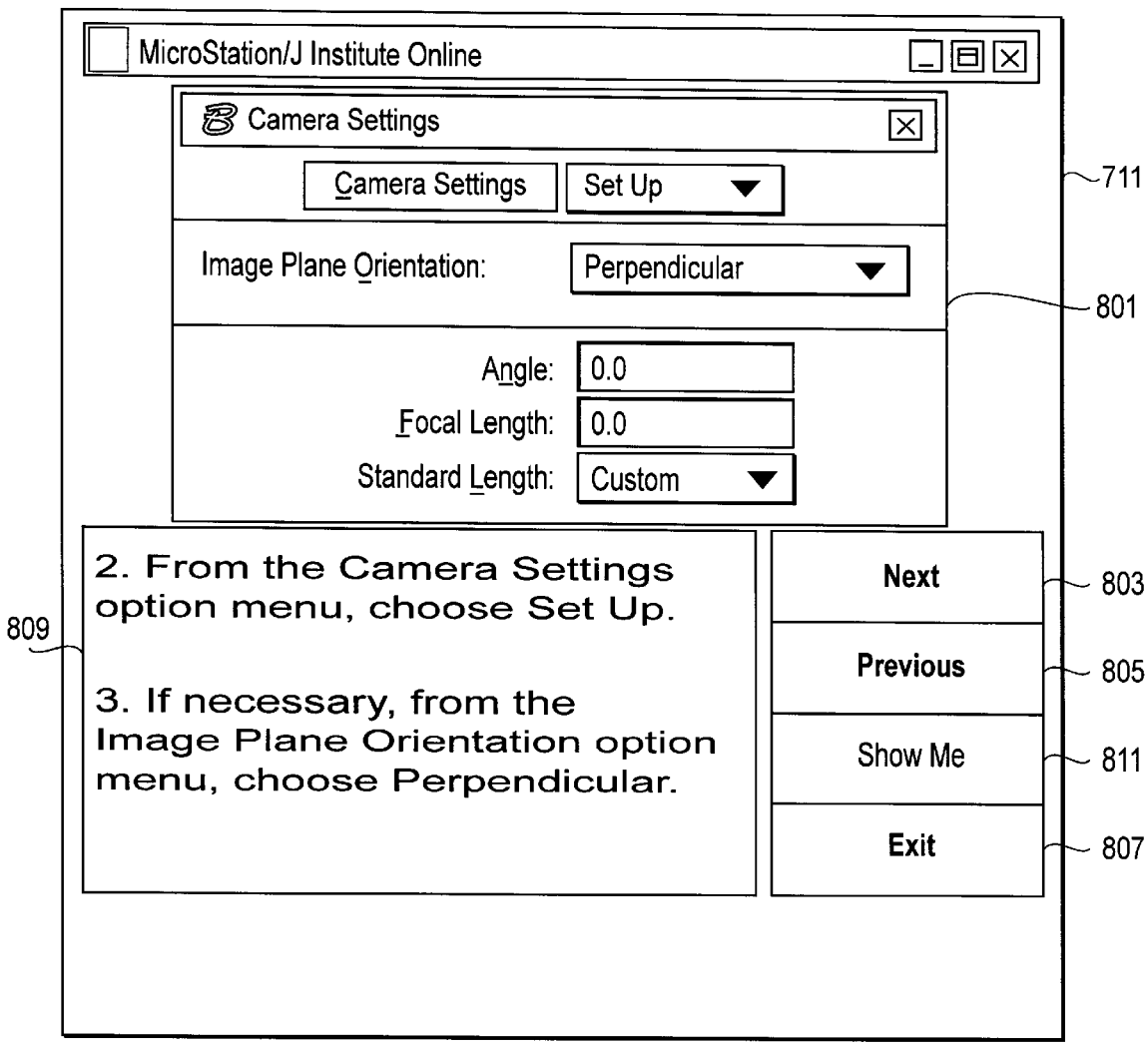
FIG. 8 is a user interface example illustrating control appropriate to a stage of the training session.
Figure 9:
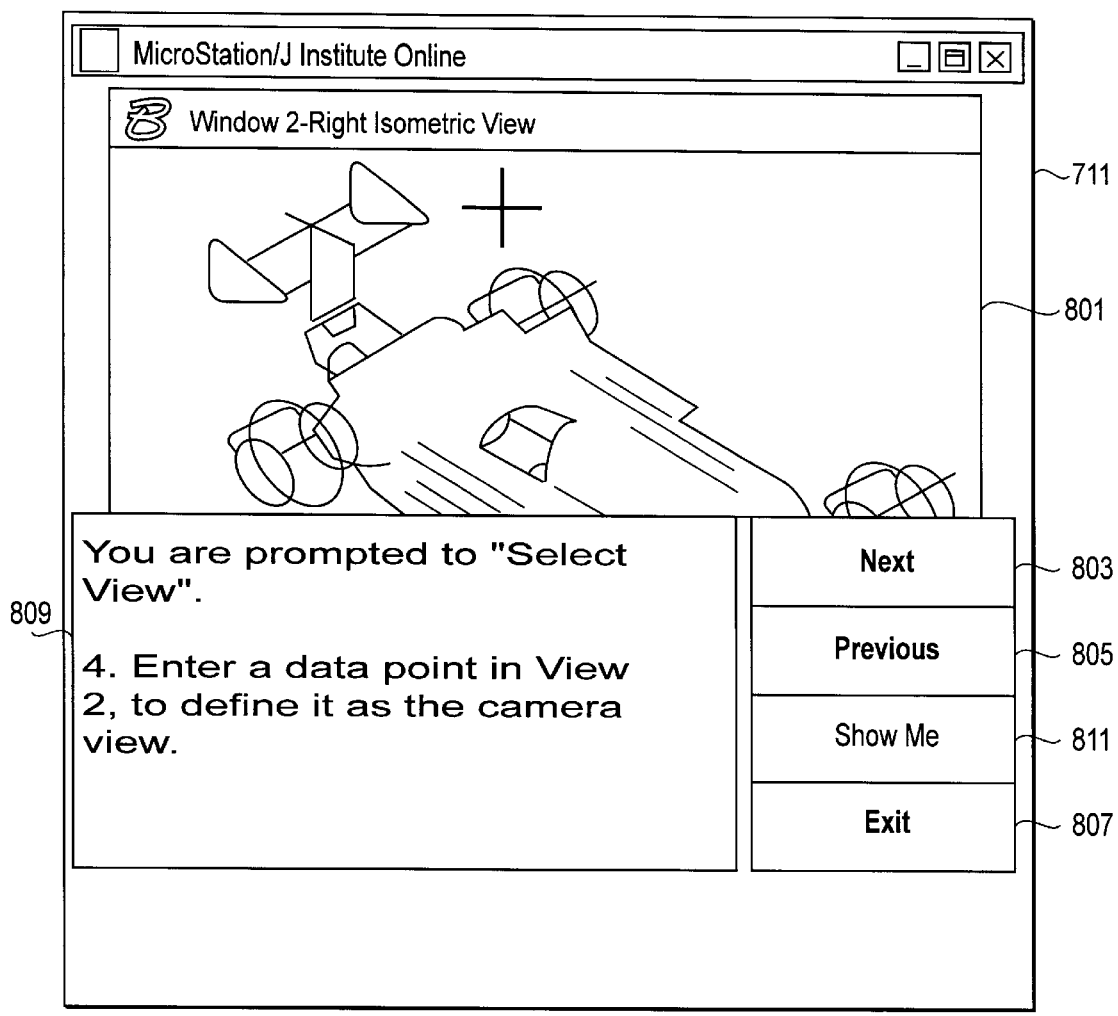
FIG. 9 is a user interface example showing responses and explanations.
Figure 10:
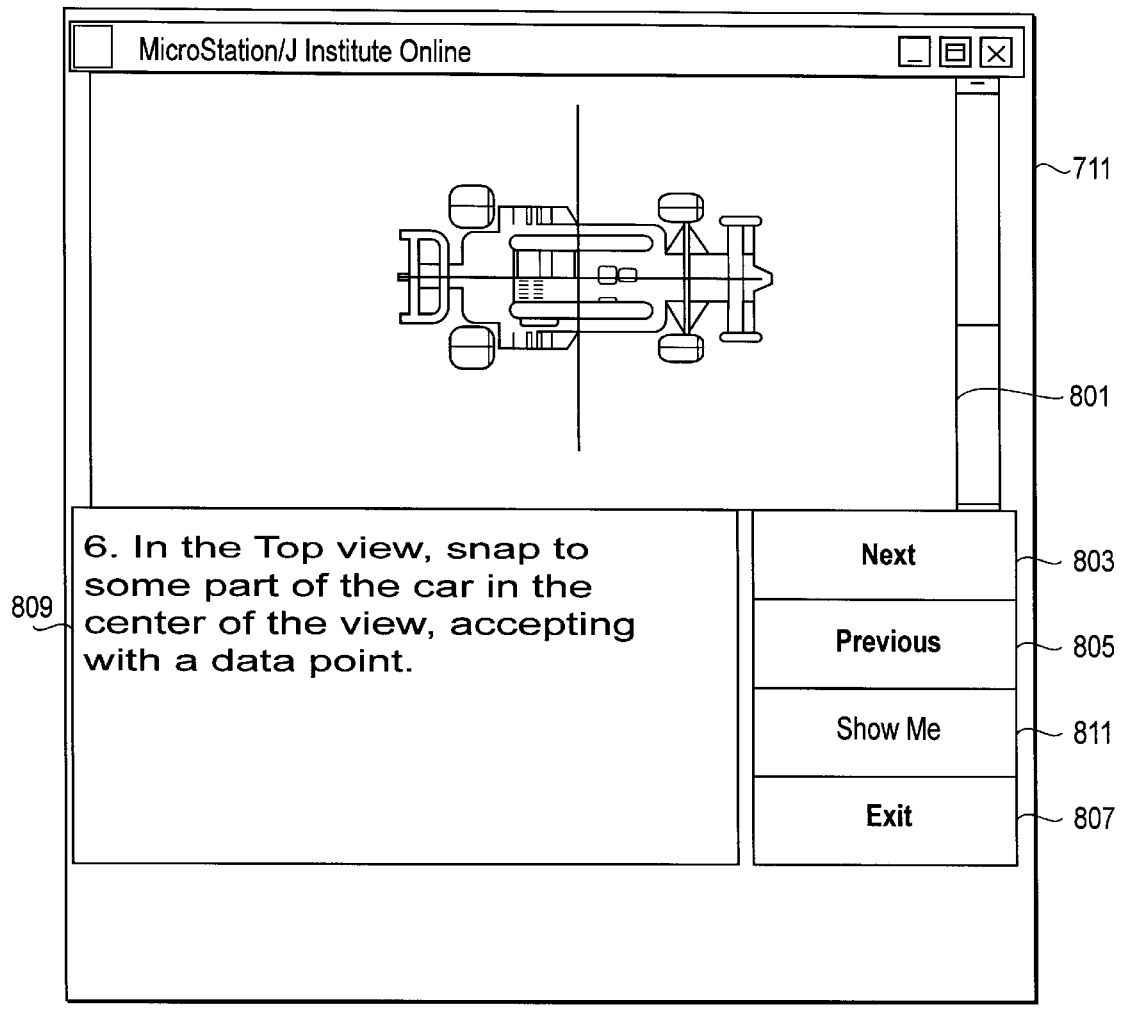
FIG. 10 is a user interface example illustrating student control of the lesson.

The text and graphics of the courseware module are displayed in the courseware viewer window 711. User interface controls 713 become available as appropriate for the current stage of the training session. Controls are illustrated in FIG. 8. In the exemplary embodiment, the controls provided include Open Tutorial 801, previous 805, next 803, step graphic 806, exercise graphic 808, step movie 810, exercise movie 811, and enlarged graphic image 812.

The text portion of the training session is displayed in the text window 809. Additional visual controls are displayed in the pulldown menus in the upper portion of the courseware viewer window 711, 801.

Graphics provided in a separate area of the courseware viewer window 711, 801 illustrate to the student what to expect to see on the screen as they complete the steps in each example. This gives the student a clear goal to work towards. Responses and explanations are displayed along with the text of the exercises in the courseware viewer text portion 809. It is preferred that the student has the ability to leave the training session, for example using the quit command from the File menu.

Figure 11:
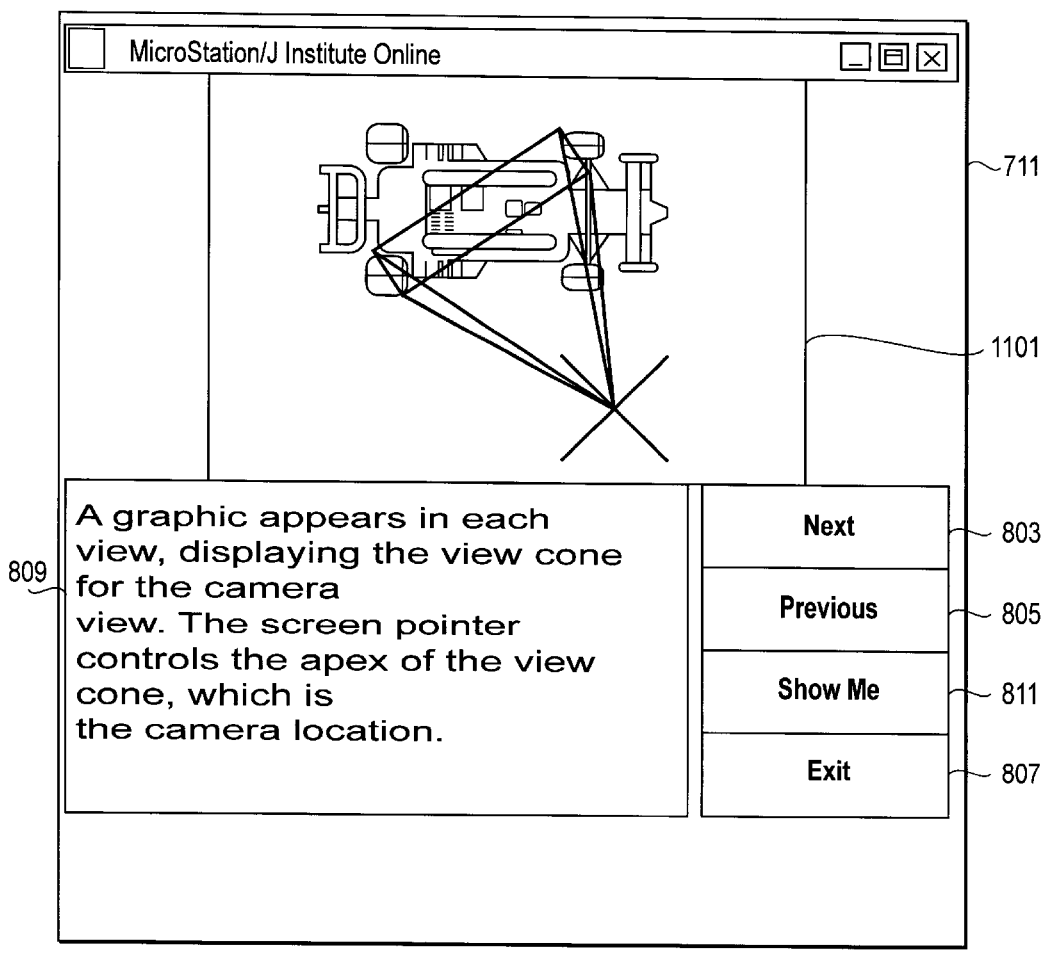
FIG. 11 is a user interface example showing a multimedia demonstration of the subject.

In this example, consider that the user has selected the next button 803. The text of the exercise advances to the next portion, and is displayed in the text window 809 and the viewing window 801. When a multimedia file corresponding to the current display becomes available, the exercise movie button becomes highlighted. Selecting this button initiates the multimedia player application. The multimedia player application plays in the same window. One example of the results of clicking the show me button is illustrated in FIG. 11. The multimedia demonstration of the subject matter is displayed in the multimedia window 1101, and the appropriate text is displayed in the text window 809.

Figure 12:
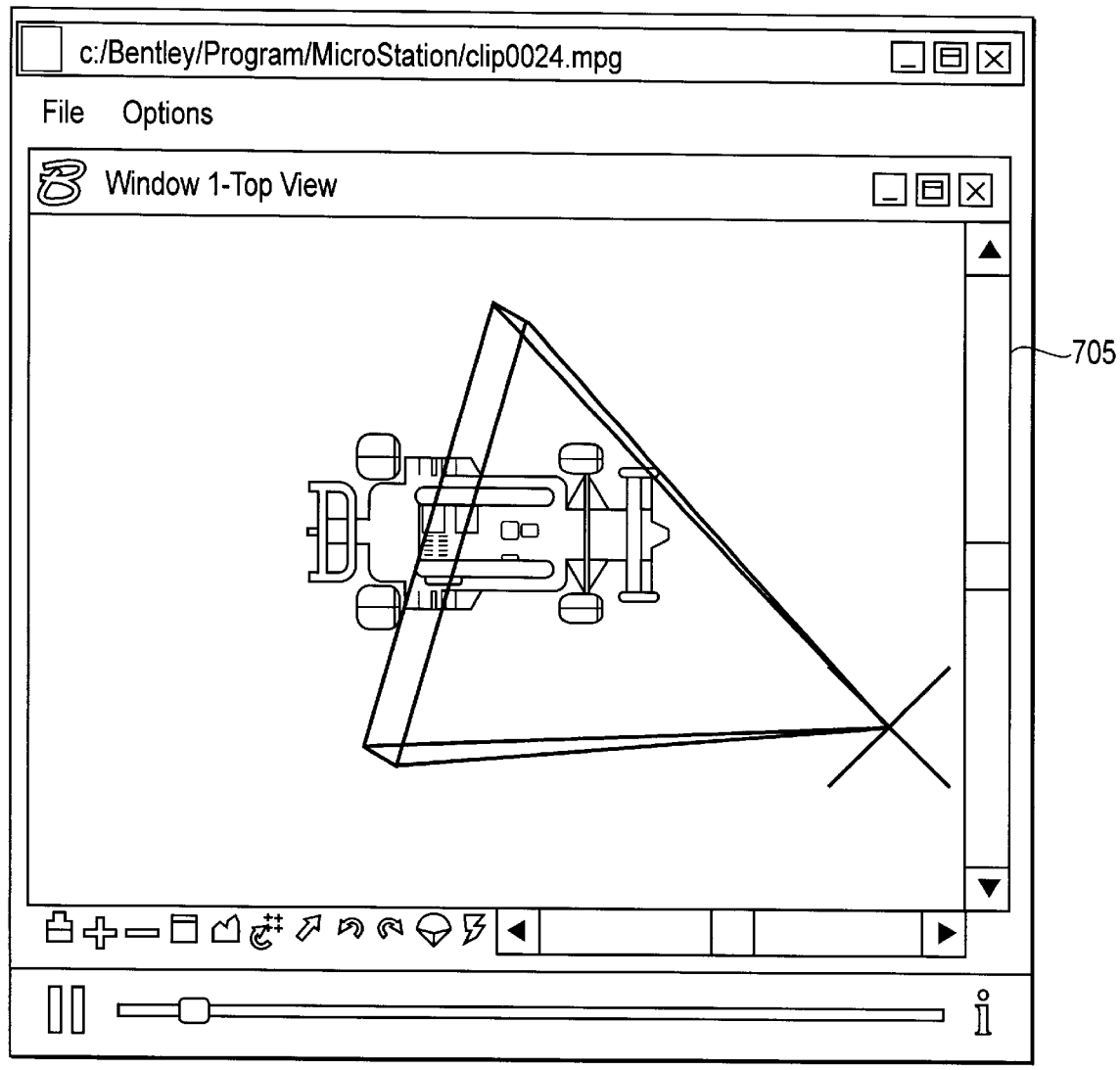
FIG. 12 is a user interface example showing a multimedia demonstration of the courseware.

Reference is now made to FIG. 12. Here, the first window 705 displays video, audio and text captions as part of a multimedia demonstration of the courseware subject matter. Also, the system preferably provides controls to pause, rewind or replay the multimedia file, and control playback speed, as well as any other conventional multimedia playback controls.

Figure 13:
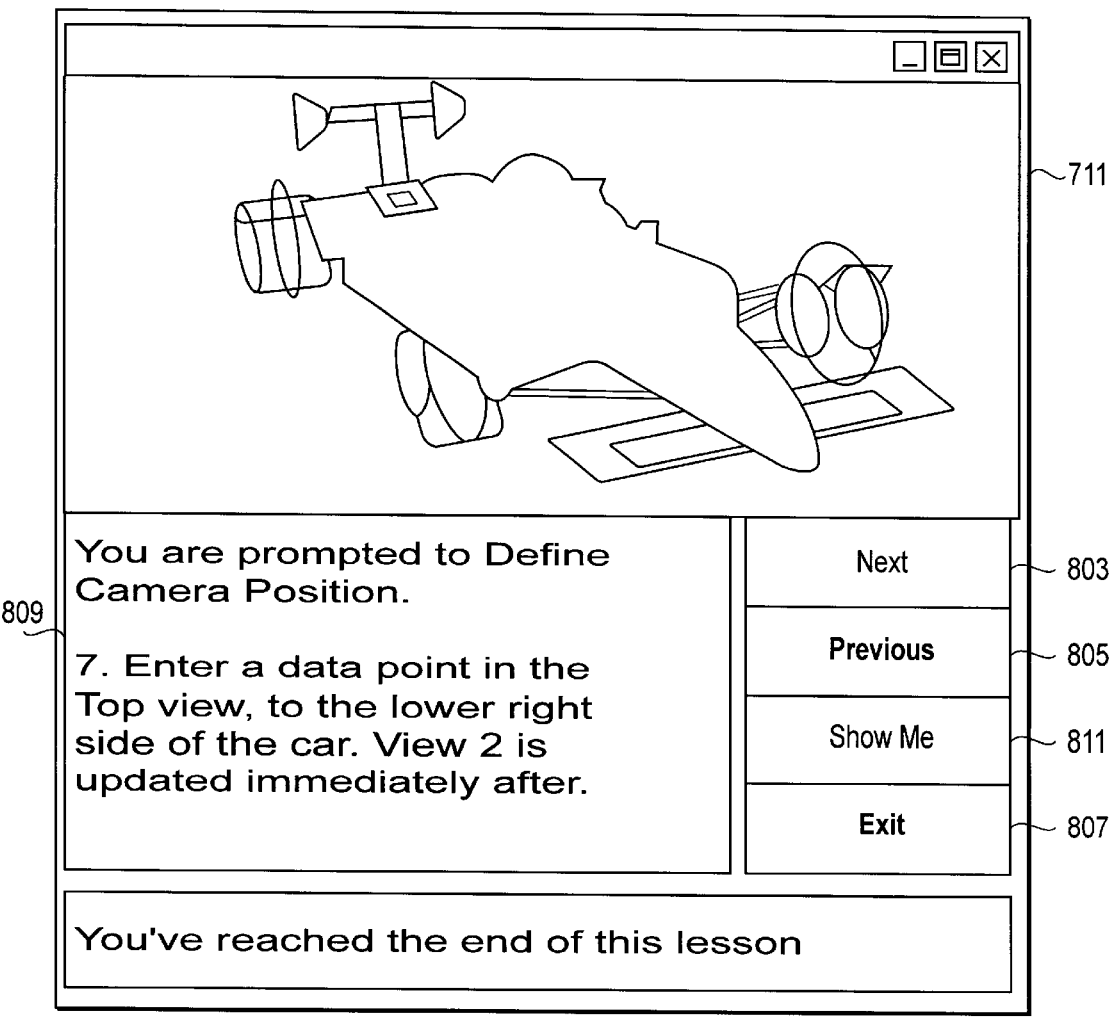
FIG. 13 is a user interface example illustrating a prompt to the student.

Reference is now made to FIG. 13. Note that prompts to the student are displayed in the content viewer application separately from the courseware content. FIG. 13 displays yet another example of the courseware content, here at the end of the lesson. At the conclusion of any particular courseware module, it is advantageous for the system to display a series of review questions to the user. This will allow some self evaluation of whether the student learned the subject material. Also at the end, a list of similar courseware topics could be displayed along with links to initiate the next training session. Advantageously, the overall length of the courseware module should be kept relatively short so that the average student could complete the courseware module in twenty (20) minutes or less.

While the preferred mode and best mode for carrying out the invention have been described, those familiar with the art to which this invention relates will appreciate that various alternative designs and embodiments for practicing the invention are possible, and will fall within the scope of the following claims.

What is claimed is:

1. A method for an interactive computer based training system for teaching a user to use a target software system via training software integrated with the target software system, comprising the steps of:
    (a) providing, from the training software, a user interface, the user interface including at least one graphic display portion, and a courseware viewer portion;
    (b) providing, from the training software system, at least one exercise module for teaching at least one tutorial exercise on operation of the target software system, the exercise module having (1) at least one display file, (2) at least one script corresponding to the at least one display file, and (3) a work file, corresponding to the at least one tutorial exercise to be loaded into the target software system; and
    (c) displaying the script in the courseware viewer portion, displaying the corresponding display file in the at least one graphic display portion, and operating at least a portion of the tutorial exercise on the target software system.

2. The method as claimed in claim 1, wherein the script includes a plurality of exercise steps, and the step of displaying the script further comprises displaying each of the exercise steps.

3. The method as claimed in claim 2, further comprising the step of receiving, from the target software system, a user response to each of the exercise steps.

4. The method as claimed in claim 3, further comprising, responsive to receipt of the user response, the step of comparing the received user response to an expected response for the exercise step.

5. The method as claimed in claim 4, wherein the exercise module defines the expected response.

6. The method as claimed in claim 4, further comprising the step of, if the received user response is the expected response, displaying a confirmation message at the user interface, and if the received user response is not the expected response, displaying a feedback message at the user interface.

7. The method as claimed in claim 6, wherein the exercise module defines the confirmation message and the feedback message.

8. The method as claimed in claim 3, wherein the user response to the exercise is received as an event, responsive to the operating of at least a portion of the tutorial exercise on the target software system.

9. The method as claimed in claim 1, further comprising the step of providing a plurality of exercise modules including the at least one exercise module, from which the at least one exercise module is selected.

10. The method as claimed in claim 1, further comprising the step of loading the work file into the target software system, and running the training software on the target software system.

11. The method as claimed in claim 1, wherein the exercise module further includes a demonstration of the at least one tutorial exercise and, responsive to user selection of the demonstration, providing the demonstration.

12. The method as claimed in claim 11, wherein the demonstration is at least one of a multimedia presentation, a graphic image, and an animation of the at least one tutorial exercise.

13. A method for an interactive computer based training system for teaching a user to use a target software system via training software integrated with the target software system, comprising the steps of:
    (a) providing, from the training software, a user interface, the user interface including at least one graphic display portion, and a courseware viewer portion;
    (b) providing, from the training software, at least one exercise module for teaching at least one tutorial exercise on operation of the target software system, the exercise module having (1) at least one display file, (2) at least one script corresponding to the at least one display file, and (3) a work file corresponding to the at least one tutorial exercise, to be loaded into the target software system;
    (c) displaying the script in the courseware viewer portion, displaying the corresponding display file in the at least one graphic display portion, and operating at least a portion of the tutorial exercise on the target software system;
    (d) wherein the script includes a plurality of exercise steps, and the step of displaying the script further comprises displaying each of the exercise steps;
    (e) loading the work file into the target software system, and running the training software on the target software system;
    (f) receiving, from the target software system, a user response to each of the exercise steps, and comparing the received user response to an expected response for the exercise step, wherein the response to the exercise is received as an event, responsive to the operating of at least a portion of the tutorial exercise on the target software system; and
    (g) if the received user response is the expected response, displaying a confirmation message at the user interface, and if the received user response is not the expected response, displaying a feedback message at the user interface.

14. A system for interactive computer based training for teaching a user to use a target software system via training software integrated with the target software system, comprising:
    (a) a user interface, the user interface including at least one graphic display portion, and a courseware viewer portion;
    (b) at least one exercise module for teaching at least one tutorial exercise on operation of the target software system, the exercise module having (1) at least one display file, (2) at least one script corresponding to the at least one display file, and (3) a work file corresponding to the at least one tutorial exercise, to be loaded into the target software system; and
    (c) a display of the script in the courseware viewer portion, a display of the corresponding display file in the at least one graphic display portion, and operation of at least a portion of the tutorial exercise on the target software system.

15. The system as claimed in claim 14, wherein the script includes a plurality of exercise steps, and the display of the script include a display of one of the exercise steps.

16. The system as claimed in claim 15, further comprising a received user response to at least one of the exercise steps.

17. The system as claimed in claim 16, further comprising, responsive to receipt of the user response, a comparison of the received user response to an expected response for the at least one of the exercise steps.

18. The system as claimed in claim 17, wherein the exercise module defines the expected response.

19. The system as claimed in claim 17, further comprising a confirmation message, to be displayed at the user interface if the user response is the expected response, and a feedback message, to be displayed at the user interface if the received user response is not the expected response.

20. The system as claimed in claim 19, wherein the exercise module defines the confirmation message and the feedback message.

21. The system as claimed in claim 16, wherein the target software system generates an event responsive to the operation by the user of at least a portion of the tutorial exercise on the target software system.

22. The system as claimed in claim 14, wherein there are provided a plurality of exercise modules including the at least one exercise module.

23. The system as claimed in claim 14, wherein the work file is loaded into the target software system, and the training software is run on the target software system.

24. The system as claimed in claim 14, wherein the exercise module includes a demonstration, responsive to the user, of the at least one tutorial exercise.

25. The system as claimed in claim 24, wherein the demonstration is at least one of a multimedia presentation, a graphic image, and an animation of the at least one tutorial exercise.

26. A system for interactive computer based training for teaching a user to use a target software system via training software integrated with the target software system, comprising:

(a) a user interface, the user interface including at least one graphic display portion, and a courseware viewer portion;

(b) at least one exercise module for teaching at least one tutorial exercise on operation of the target software system, the exercise module having (1) at least one display file, (2) at least one script corresponding to the at least one display file, and (3) a work file corresponding to the at least one tutorial exercise, to be loaded into the target software system;

(c) a display of the script in the courseware viewer portion, a display of the corresponding display file in the at least one graphic display portion, and operation of at least a portion of the tutorial exercise on the target software system;

(d) wherein the script includes a plurality of exercise steps, each of the exercise steps being sequentially displayed, and the script includes an expected response for each of the exercise steps;

(e) wherein the target software system generates an event responsive to an operation of at least a portion of the tutorial exercise on the target software system; and (f) a display of a confirmation message at the user interface, if the user response is the expected response, and a display of a feedback message at the user interface, if the received user response is not the expected response.

* * * * *